United States Patent

Suzuki et al.

Patent Number: 6,013,965
Date of Patent: *Jan. 11, 2000

[54] MOTOR STRUCTURE

[75] Inventors: Yuzuru Suzuki, Shizuoka; Sakae Fujitani, Hamakita, both of Japan

[73] Assignee: Minebea Co., Ltd., Kitasaku, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/675,836

[22] Filed: Jul. 5, 1996

[30] Foreign Application Priority Data

Jul. 6, 1995 [JP] Japan ................................. 7-170081

[51] Int. Cl.[7] ........................... H02K 1/06; H02K 1/12; H02K 21/14
[52] U.S. Cl. ......................... 310/186; 310/190; 310/254; 310/256; 310/257
[58] Field of Search ......................... 310/254, 190, 310/186, 67 R, DIG. 6, 256, 257, 268, 209; 360/98.07, 99.04, 99.08

[56] References Cited

U.S. PATENT DOCUMENTS

| | | | |
|---|---|---|---|
| 4,166,226 | 8/1979 | Estkowski | 310/41 |
| 4,394,595 | 7/1983 | Weaver | 310/162 |
| 4,755,698 | 7/1988 | Frister et al. | 310/51 |
| 4,975,607 | 12/1990 | Hara et al. | 310/67 R |
| 5,008,573 | 4/1991 | Beppu et al. | 310/67 R |
| 5,057,725 | 10/1991 | Kasai et al. | 310/51 |
| 5,107,159 | 4/1992 | Kordik | 310/156 |
| 5,331,245 | 7/1994 | Burgbacher et al. | 310/186 |

FOREIGN PATENT DOCUMENTS

| | | | |
|---|---|---|---|
| 0635 926 A3 | 7/1994 | European Pat. Off. | H02K 21/16 |
| 3466650 | 4/1984 | U.S.S.R. | 310/12 |
| 1 396 305 | 5/1971 | United Kingdom | H02K 21/14 |

OTHER PUBLICATIONS

European International Search Report, Mar. 14, 1995.

*Primary Examiner*—Nestor Ramirez
*Assistant Examiner*—Burton S. Mullins
*Attorney, Agent, or Firm*—Staas & Halsey, L.L.P.

[57] ABSTRACT

This invention is to provide a low-cost structure that a cogging torque and a torque ripple are small and a stable rotation is provided in a radial gap type motor.

A portion that stator pole teeth 37 to become interpoles are provided between stator poles 38 and a plurality of stator pole teeth 37 are not continuously provided between the partial stator poles 38 is provided. As a result, in this invention, a magnetic attraction force between the stator pole teeth 38 and the rotating pole 9 of a rotor 6 is stronger in the case that the pole teeth 37 are provided than in the case that the pole teeth 37 are not provided.

Accordingly, the rotational shaft 12 of the rotor 6 is supported at three points of points P, Q and R of the bearing cylinder 4, and a rotary force is received at the point P as a center. As a consequence, the rotational shaft 12 is rotated with less contact friction with the bearing cylinder 4.

11 Claims, 5 Drawing Sheets

MOTOR STRUCTURE

BACKGROUND OF THE INVENTION

1. Field of the Invention

This invention relates to a structure that can regulate an air gap magnetic flux (density) in a radial gap type motor and easily regulate a magnetic force for acting in an axial direction between a rotor magnet and a stator core.

2. Description of the Prior Art

A radial gap type motor or particularly an outer rotor type increases a volume of a rotor magnet and increases an opposed area between a stator yoke (a salient pole of a stator) and the magnet, and is hence generally suitable for the utility of the type required for a low speed and a high torque. For instance, a spindle motor of a direct drive type floppy disk drive (hereinafter referred to as an "FDD") is mostly of this type.

However, the following problems arise since a magnet volume is large and the opposed area to the stator yoke is large.

(1) A cogging torque and a torque ripple are large, and when a speed is controlled, a rotation uniformity is deteriorated. Accordingly, it is necessary to regulate an air gap magnetic flux (density) distribution by some methods and to reduce the cogging torque.

(2) If a magnetic balance between the rotor magnet and the stator yoke in an axial direction is not provided (generally in a structure that an attraction force is applied from a bearing structure in an axial direction), a magnetic attraction force is always acted between the rotor magnet and the stator yoke, and this force is acted to a bearing. In this case, in the bearing structure where two ball bearings are used, the force is not so troublesome but there is a disadvantage in an increase in a bearing cost. On the other hand, in a sleeve bearing structure, a radial clearance of about several microns is required between the bearing and the rotational shaft, the axial deflection of the rotating rotor is increased (deteriorated) due to the magnetic unbalance between the rotor and the stator according to this clearance, and hence the rotating accuracy is decreased.

SUMMARY OF THE INVENTION

This invention improves the above-described conventional inconvenience. Pole teeth formed of soft magnetic material (separate from a stator yoke) are projected into an air gap of a radial direction formed between a magnet and a stator yoke to regulate a magnetic flux density and its distribution in the air gap and to simultaneously regulate an axial load amount. Further, in a motor of the type using a sleeve bearing, shaking generated from a clearance between the bearing and a shaft is suppressed, the gradient of the shaft is aligned in a predetermined direction, and a motor structure in which the shaft deflection is stabilized is provided.

In a flat radial gap type DC brushless motor in which the external radiation of a leakage magnetic flux becomes troublesome pole teeth except a stator yoke, the pole teeth being formed of a soft magnetic material in an air gap of a radial direction. The brushless motor being formed of a rotor magnet and a stator yoke are positively projected into the air gap thereby to positively alter a magnetic flux density and its distribution formed only of the rotor magnet and the stator yoke. This improves a cogging torque and a torque ripple and hence improves the rotating unevenness. Incidentally, the pole teeth except the stator yoke is preferably formed by a method for partly pressing a motor mounting board formed of a soft magnetic material (iron plate or the like) and projecting it into an air gap area, or preferably formed of a soft magnetic material and clamped byscrews, caulking, molding, etc., on the motor mounting board. The motor mounting board of this case may not always be a soft magnetic material.

A force of an axial direction acting between a rotor magnet and a stator yoke by the above-described pole teeth except the stator yoke can be increased, and hence the axial magnetic attraction force can be increased. In a motor of a bearing structure using a sleeve bearing, with respect to the deterioration of the deflection due to the shaking in the radial direction between the rotational shaft and the bearing which becomes troublesome in this case, if the protrusions of the pole teeth are made irregular on the entire periphery (the partial protrusions of the entire periphery are thinned out), there arise strong and weak magnetic attractions in the axial direction, the rotational shaft can be unitarily inclined, and hence the stability of the shaft in the case of rotating the rotor is obtained, and the deflection can be improved that much.

DESCRIPTION OF THE PREFERRED EMBODIMENTS

Figure 1:
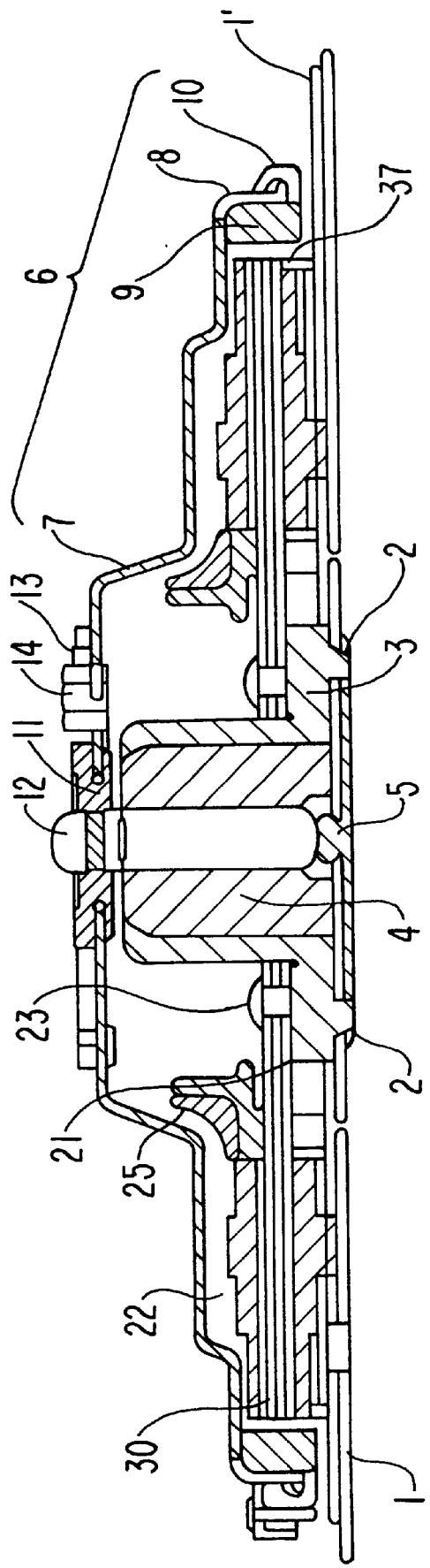
FIG. 1 is a sectional view of a radial gap type motor.

An embodiment of this invention will be described in detail with reference to the accompanying drawings. FIG. 1 is a sectional view showing the state that a stator section of a motor is mounted on a motor mounting board 1 formed of a soft magnetic material in which an electric wiring plate 1' provided with printed wirings is provided on a surface and a rotor is rotatably provided on the board 1.

In FIG. 1, numeral 1 denotes a board for forming a floppy disk drive, which is formed of a soft magnetic material such as iron or the like. A plurality of holes 2 are perforated at the central part of the board 1, and a stationary base 3 made of synthetic resin is fixed by injection molding with the holes as mounting parts. A cylindrical bearing cylinder 4 is fixed to the center of the stationary base 3. A pivot 5 for supporting the bottom of the shaft 12 to be described later is provided at the bottom of the bearing cylinder 4. Numeral 7 designates a rotary disk which constitutes a rotor to rotate a floppy disk, which is formed in a thin circular tray state. A rotating pole 9 made of a ring-shaped permanent magnet is fixed to the inside of the outer periphery 8 of the rotary disk 7. A speed detecting permanent magnet 10 for detecting the rotating speed of the rotary disk 7 is fixed to the lower portion of the outer periphery 8. A plurality of poles are formed by magnetizing at the rotating pole 9. The polarities of the poles are opposite at the adjacent poles. A rotary disk 7 assembly including the rotating poles 9 constitutes a rotor 6.

Figure 2:
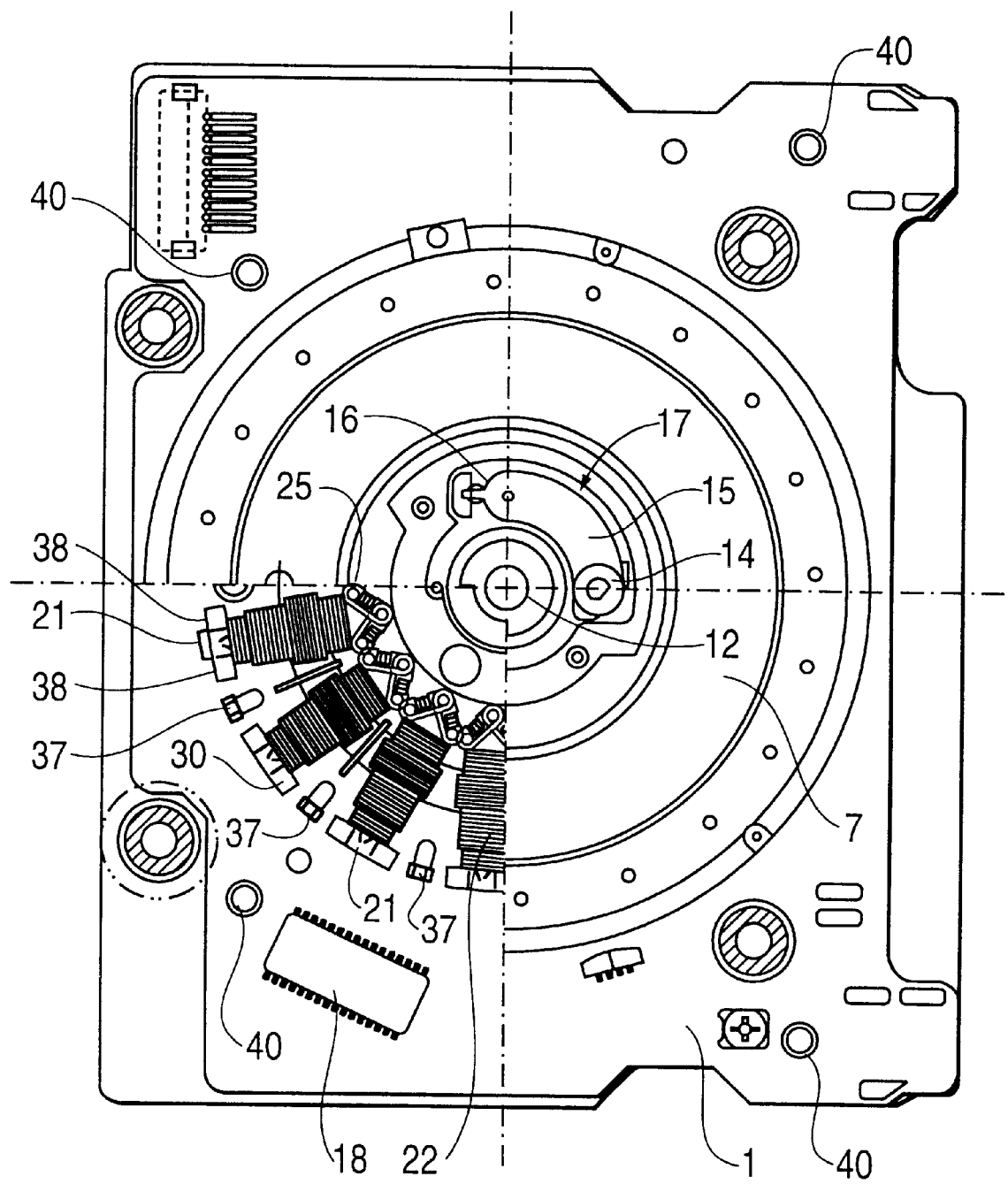
FIG. 2 is a plan view of a radial gap type motor.

A rotational shaft mounting plate 11 made of metal is fixed to the central part of the rotary disk 7, and a rotational shaft 12 is fixed to the center of the rotational shaft mounting plate 11. The rotational shaft 12 is rotatably supported by the cylindrical bearing cylinder 4. A hole 13 is opened at the rotary disk 7, and a drive pin 14 is projected from the hole 13. As shown in FIG. 2, the drive pin 14 is fixed to the other end of a spring plate 15 fixed at one end to the rotary disk 7. The spring plate 15 has a mounting base 16 and an arm 17 continued to the base 16, and the drive pin 14 is provided at the end of the arm 17. In FIG. 1, numeral 21 depicts a stator pole; and 22, a stator winding. The stator pole 21 is fixed to the board 1 by caulking a protrusion 23 projected from the stationary base 3. Though not shown, a thin sheetlike attraction magnet is provided at the center of the rotational shaft 12 on the surface of the rotary disk 7. This attraction magnet attracts a soft iron plate provided at the center of the floppy disk to be rotatably driven, and fixes it to the rotary disk 7. In FIGS. 1 and 2, numeral 25 denotes a terminal provided at the stationary base 3.

Though not shown, lead wires extended from the stator winding 22 are wound at the terminal 25, and the terminal is connected to printed wirings formed on the surface of the electric wiring plate 1'. Numeral 18 designates a drive IC for driving a 3-phase brushless DC motor provided on the plate 1', which contains a speed servo controller.

The characteristic portions of this invention which have not been described so far by using FIGS. 1 and 2 will be described. Pole teeth 37 are the portions. The characteristics resides in that the part of the motor mounting plate 1 made of a soft magnetic material is louvered (a complementary hole 39 is opened at the part interfered with the electric wiring plate 1' of the upper surface of the plate 1) to project radially near the intermediate part of the stator pole teeth 38 at the end of the stator pole 21 in the circumferential direction at the place for effectively regulating the magnetic flux (density) and its distribution in the air gap by the stator pole teeth 38.

Figure 3:
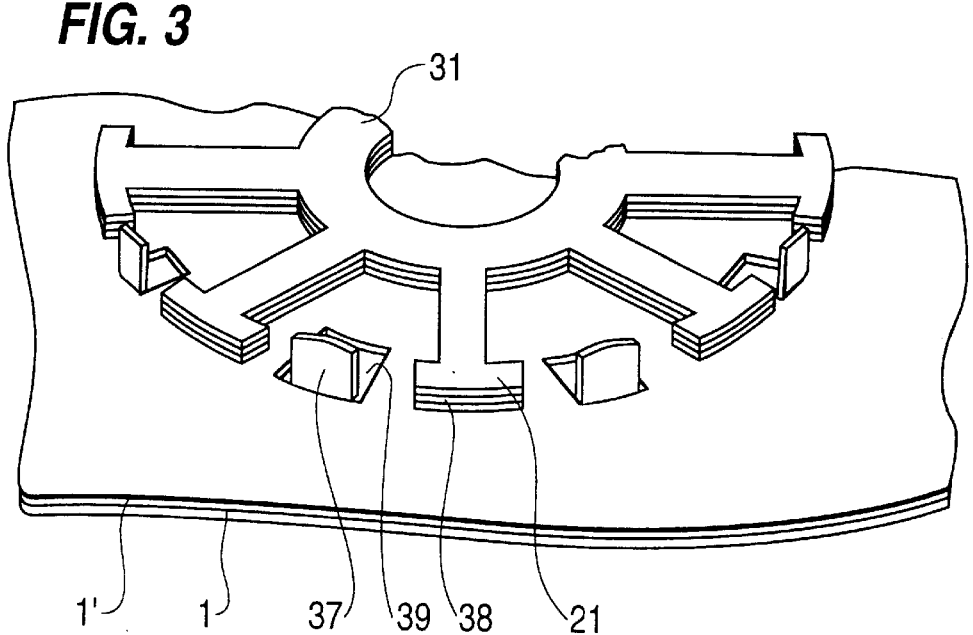
FIG. 3 is a partially perspective view showing a stator pole section.

By referring to FIG. 3, the detail will be described. FIG. 3 is a perspective view showing the state that the rotary disk 7 is removed and the bearing cylinder 4 and the stator winding 22 are not present. The state that the plate 1 for mounting the motor is louvered at each slot of the stator pole 21 and projected to the portion opposed to the air gap (not shown) is shown.

It is easily estimated that the quantity of the stator core in the air gap is altered by the pole teeth 37 and the magnetic flux (density) and its distribution in the air gap are altered. Particularly, in the stator structure in which the magnetic flux (density) and its distribution are regulated by interpoles, the interpoles are eliminated, and the function of the interpoles can be substituted by the pole teeth 37. As a result, there is a merit of improving the points that the stator winding operation is hardly conducted by the interpoles and the decrease in the winding space factor is improved. Of course, cogging torque and torque ripple can be improved by regulating the position, the area (shape) of the pole teeth 37 and the curvature for the air gap.

Figure 4:
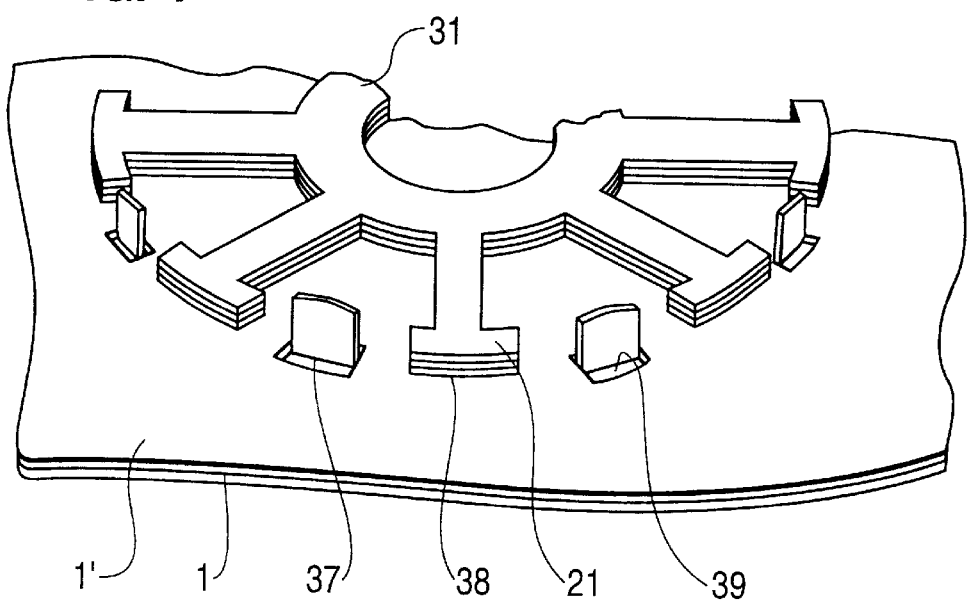
FIG. 4 is a partially perspective view showing another embodiment of a stator pole section.

FIG. 4 is similar to FIG. 3 with respect to that the pole teeth 37 are projected to the slots of the stator pole 21, but shows the case that the louvering direction from the motor mounting plate 1' is different (in FIG. 3, the slot side is louvered, but in FIG. 4, the gap side is louvered), and shows the example of the case that the size of the hole of the electric wiring plate 1' is different (in FIG. 3, the hole is the entire nicked of the pole teeth 37, but in FIG. 4, only the end of the pole teeth 37 is projected in the hole). In the drawings, the case that the stator winding 22 is a concentrated winding, but can be also used for a lap winding.

Figure 5A:
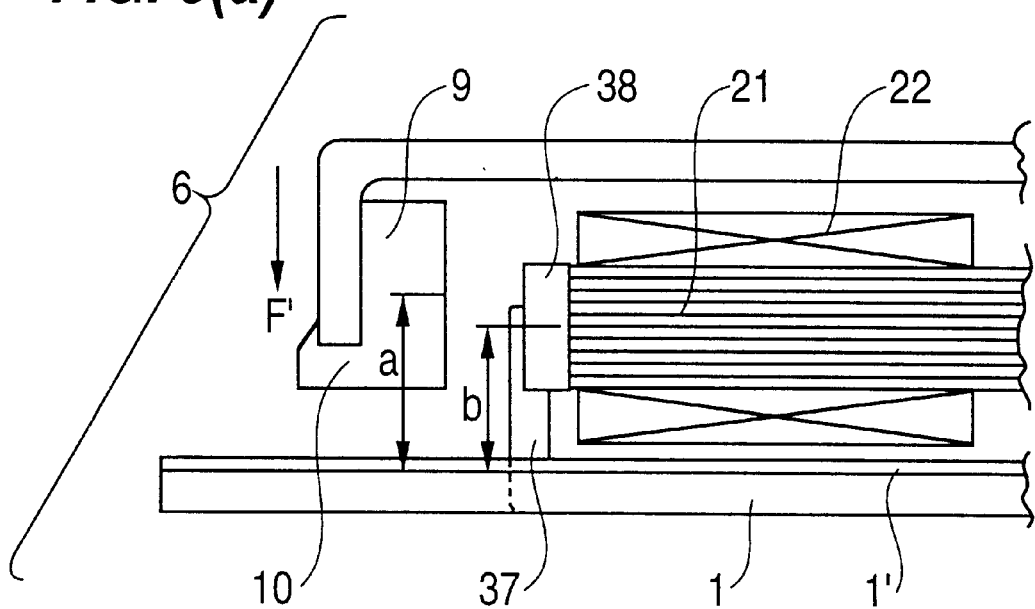
FIGS. 5(a) and 5(b) are partially perspective views for describing the operating state of the embodiment of this invention.
Figure 5B:
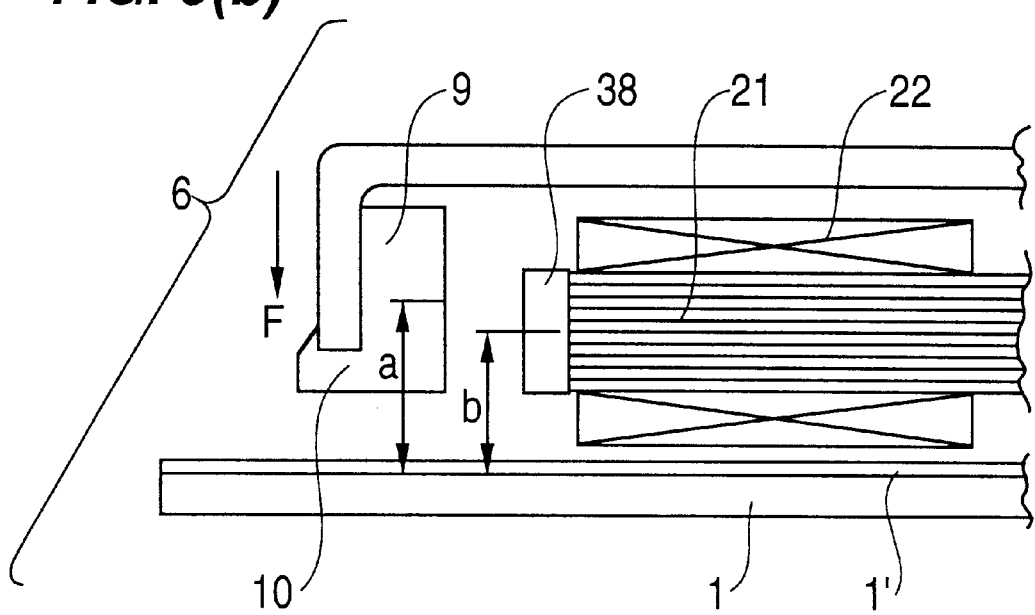

Then, a magnetic balance of the pole teeth 37 of this invention in an axial direction will be described by referring to FIGS. 5(a) and 5(b). FIGS. 5(a) and 5(b) show the positional relationship in the axial direction between the rotating pole 9 and the stationary pole 21 and between the stator pole teeth 38 and the plate 1 for mounting the motor. As shown in FIG. 5(b), if the pole teeth 37 are not provided between the stator pole teeth 38, when an axial magnetic central point A of the rotating pole 9 in the air gap plane (a distance from the plate 1 is a) and the central point B of the axial magnetic reluctance (1/permeance) of the stator pole teeth 38 (a distance from the plate 1 is b) are provided, a>b is satisfied, with the result being that it is understood that a force always attracting to the plate 1 side acts at the rotor 6 due to the increase in the permeance (actually, the rotational shaft 12 presses the pivot 5 though not shown in FIG. 5). Actually, in addition to this force, it is further increased by the magnetic attraction force between the speed detecting permanent magnet 10 and the plate 1.

On the other hand, FIG. 5(a) shows the case that the pole teeth 37 are provided between the stator pole teeth 38. In this case, the axial magnetic central point A of the rotating pole 9 is not altered from the case of FIG. 5(b), but the axial magnetic center of the stator pole teeth 38 is lowered that much to the point B' moved to the plate 1 (lower side) side (a distance from the plate 1 is b') by the provision of the pole teeth 37, and much larger magnetic attraction force than that of FIG. 5(b) is acted between the rotor 6 and the plate 1, and it is understood that the rotational shaft 12 pushes the pivot 5.

This force becomes a very important force to rotate the rotor 6 with stability in the bearing of the sleeve type shown in FIGS. 1 and 2. Further, to smoothly rotate in the bearing of the sleeve type, a radial air gap (gap: shaking) is always necessary between the bearing cylinder 4 and the rotational shaft 12, the shaking of the plane including the gap of the rotor 6 is increased by this gap. Therefore, it is considered that the gap is generally inclined in a predetermined direction (position) with respect to the motor mounting plate 1 and the increase in the shaft deflection due to the gap is suppressed.

Figure 6:
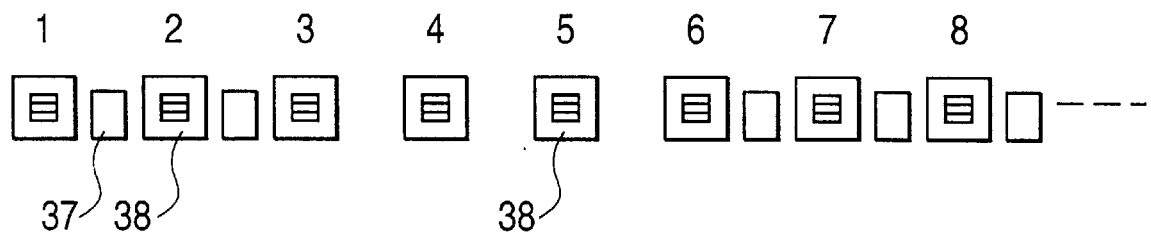
FIG. 6 is a developed view of the stator pole of the motor of this invention.

According to this invention, the gap can be simply eliminated without cost by partly thinning the pole teeth 37 (the rotational shaft 12 is inclined in a predetermined direction by inclining the rotor 6 with respect to the plate 1). FIG. 6 shows a developed view of the state that the pole teeth 37 are partly thinned.

Figure 7:
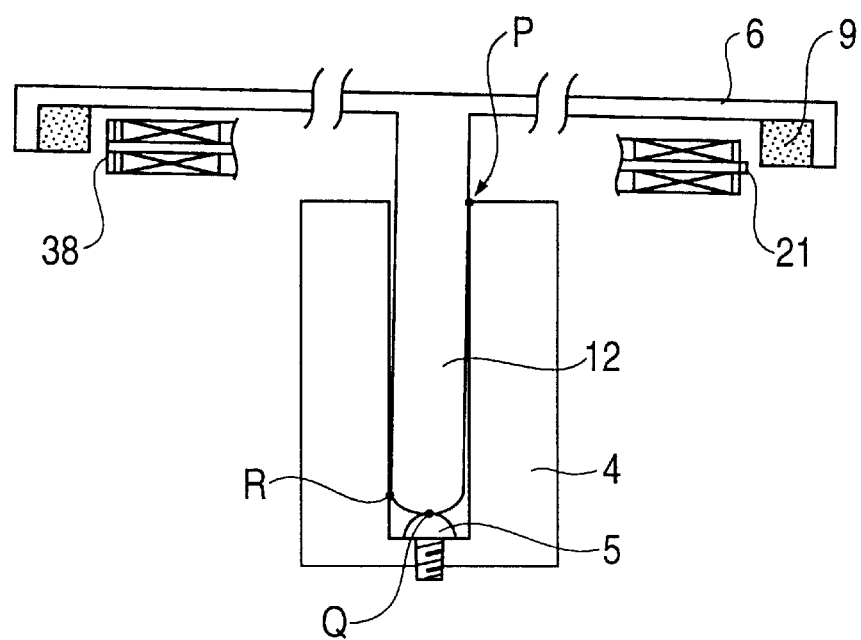
FIG. 7 is a partial sectional view for describing the operating state of the embodiment of this invention.

FIG. 7 is a sectional view cut at the rotational shaft of the motor as a center. As understood from FIG. 7, when the pole teeth 37 are provided in this invention, the axial attraction force between the stator pole teeth 38 and the rotating pole 9 of the rotor 6 is strengthened as compared with the case that the pole teeth 37 are not provided. Accordingly, the rotational shaft 12 of the rotor 6 is stably rotated by determining the inclining direction so that three points P, Q and R are supported in the bearing cylinder 4.

In the embodiments described above. the pole teeth 37 of the portion for weakening the axial attraction force between the rotating pole 9 and the stator pole 21 are thinned. The regulation of such an attraction force may be performed even if the width or the height of the pole teeth 37 is altered.

Though not shown and not described, the inclination of the rotational shaft 12 can be regulated by the axial attraction force and the rotor can be stably rotated similarly even by the case where the composite type of a ball bearing plus a sleeve bearing is formed.

From the foregoing description, the following effects can be provided:

1) A cogging torque and a torque ripple can be improved without cost, the operation of winding and the like is facilitated as compared with the structure that interpoles are formed with stator pole pieces as prior art, the winding space factor can be raised, and the motor characteristics can be improved
2) A necessary axial magnetic attraction force can be generated even in a radial gap type laminated motor, and a low-cost sleeve bearing can be used.
3) A rotational shaft is inclined in a predetermined direction without cost to constitute a stable motor having no deflection.

We claim:

1. A motor structure for a radial gap type motor having a plurality of stator poles and a rotor pole, comprising:
   a rotating shaft;
   a board made of soft magnetic material and having a magnetic flux regulating pole tooth; and
   an electric wiring plate bearing a circuit for controlling a motor rotation;
   wherein the electric wiring plate is formed on the board,
   the stator poles each comprise an end portion and are formed on the electric wiring plate and disposed in a radial direction with respect to the rotating shaft;
   the rotor pole confronts an end portion of the stator poles,
   the electric wiring plate has a hole between two end portions of the stator poles for the pole tooth to pass therethrough, and
   the pole tooth is located between two end portions of the stator poles and extends from the board in a vertical direction.

2. A motor structure according to claim 1, wherein the pole tooth is made of a punched-out section at a right angle to the board to thereby leave a complementary hole having the same shape as that of the pole tooth at a connection thereof to the board.

3. A motor structure according to claim 2, wherein the pole tooth is formed in the board in such a manner that a cut line of the same shape as an external form of the pole tooth is formed in the board material, and an inside portion defined by the cut line is bent at the connection in a vertical direction to the board.

4. A motor structure according to claim 2, wherein the pole tooth is disposed at an outer position with respect to the complementary hole.

5. A motor structure according to claim 2, wherein the pole tooth is disposed at an inner position with respect to the complementary hole.

6. A motor structure according to claim 1, wherein a plurality of the pole teeth are disposed circumferentially at regular intervals.

7. A motor structure according to claim 1, wherein a plurality of the pole teeth are disposed circumferentially at irregular intervals.

8. A motor structure according to claim 1, further comprising a plurality of pole teeth, wherein a plurality of the pole teeth have the same width.

9. A motor structure according to claim 1, further comprising a plurality of pole teeth, wherein a plurality of the pole teeth have different widths.

10. A motor structure according to claim 1, further comprising a plurality of pole teeth, wherein a plurality of the pole teeth have the same height.

11. A motor structure according to claim 1, further comprising a plurality of pole teeth, wherein a plurality of the pole teeth have different heights.

* * * * *